(12) United States Patent
Gabrielson et al.

(10) Patent No.: US 11,372,634 B1
(45) Date of Patent: Jun. 28, 2022

(54) SPECIALIZED CLOUD PROVIDER REGIONS FOR AVAILABILITY-SENSITIVE WORKLOADS

(71) Applicant: Amazon Technologies, Inc., Seattle, WA (US)

(72) Inventors: Jacob Adam Gabrielson, Seattle, WA (US); Joshua M Burgin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 16/776,200

(22) Filed: Jan. 29, 2020

(51) Int. Cl.
*G06F 8/60* (2018.01)
*G06F 8/65* (2018.01)
*H04L 67/10* (2022.01)
*G06F 9/54* (2006.01)
*H04L 43/08* (2022.01)
*H04L 67/00* (2022.01)

(52) U.S. Cl.
CPC ............. *G06F 8/65* (2013.01); *G06F 8/60* (2013.01); *G06F 9/54* (2013.01); *H04L 43/08* (2013.01); *H04L 67/10* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 7,913,249 | B1 * | 3/2011 | MacIntyre | G06F 8/61 717/174 |
| 8,595,806 | B1 * | 11/2013 | Gabrielson | H04L 63/18 726/7 |
| 9,503,351 | B1 * | 11/2016 | Gabrielson | H04L 41/28 |
| 10,768,920 | B2 * | 9/2020 | Fontoura | G06F 8/65 |
| 10,897,468 | B1 * | 1/2021 | Chhabra | H04L 63/20 |
| 2014/0114644 | A1 * | 4/2014 | Smith | H04L 43/50 704/9 |
| 2015/0058834 | A1 * | 2/2015 | Chan | H04L 67/327 717/169 |
| 2017/0180487 | A1 * | 6/2017 | Frank | H04L 41/0813 |
| 2018/0032399 | A1 * | 2/2018 | Johnson | G06F 11/2033 |
| 2018/0165185 | A1 * | 6/2018 | Boshev | G06F 11/0793 |
| 2018/0189046 | A1 * | 7/2018 | Kunisetty | H04L 41/082 |

(Continued)

*Primary Examiner* — Philip Wang
(74) *Attorney, Agent, or Firm* — Nicholson De Vos Webster & Elliott LLP

(57) ABSTRACT

Techniques are described that enable a cloud provider network to provide specialized regions that can be used to achieve greater availability assurance for workloads highly sensitive to downtime or outages. Cloud provider network users may use specialized regions to complement the use of provider network services offered in other geographic regions defined by the cloud provider network, either to host redundant computing resources or for failover purposes, where the operation of a specialized region is designed to provide additional resiliency against various types of correlated failures among the geographic regions. As one example, a cloud provider network may stage deployments of software updates to the web services provided by the cloud provider network in a manner that ensures that specialized regions receive such updates last and over a relatively long period of time, thereby helping to ensure that any software defects are detected in an earlier deployment of the update.

20 Claims, 10 Drawing Sheets

(56) References Cited

U.S. PATENT DOCUMENTS

| | | | |
|---|---|---|---|
| 2018/0349179 A1* | 12/2018 | Worboys | G06F 9/4881 |
| 2019/0294531 A1* | 9/2019 | Avisror | G06F 11/3676 |
| 2019/0372908 A1* | 12/2019 | Featonby | H04L 67/1095 |
| 2020/0034270 A1* | 1/2020 | Desai | H04L 41/16 |
| 2021/0067468 A1* | 3/2021 | Cidon | H04L 43/026 |

* cited by examiner

SPECIALIZED CLOUD PROVIDER REGIONS FOR AVAILABILITY-SENSITIVE WORKLOADS

BACKGROUND

Modern businesses and other entities increasingly rely on a wide variety of computing systems and workloads to operate efficiently. The increased reliance on such computing systems has placed an importance on the availability of many types of workloads. In this context, availability generally refers to a level of operational performance, such as "uptime," in which a computing system or workload is accessible. A number of techniques are commonly used to increase the availability of computing systems and associated workloads such as, for example, utilizing redundant computing systems and workloads, efficiently detecting occurrences of failures, and providing efficient failover mechanisms.

BRIEF DESCRIPTION OF DRAWINGS

Various embodiments in accordance with the present disclosure will be described with reference to the drawings, in which.

DETAILED DESCRIPTION

Figure 1:
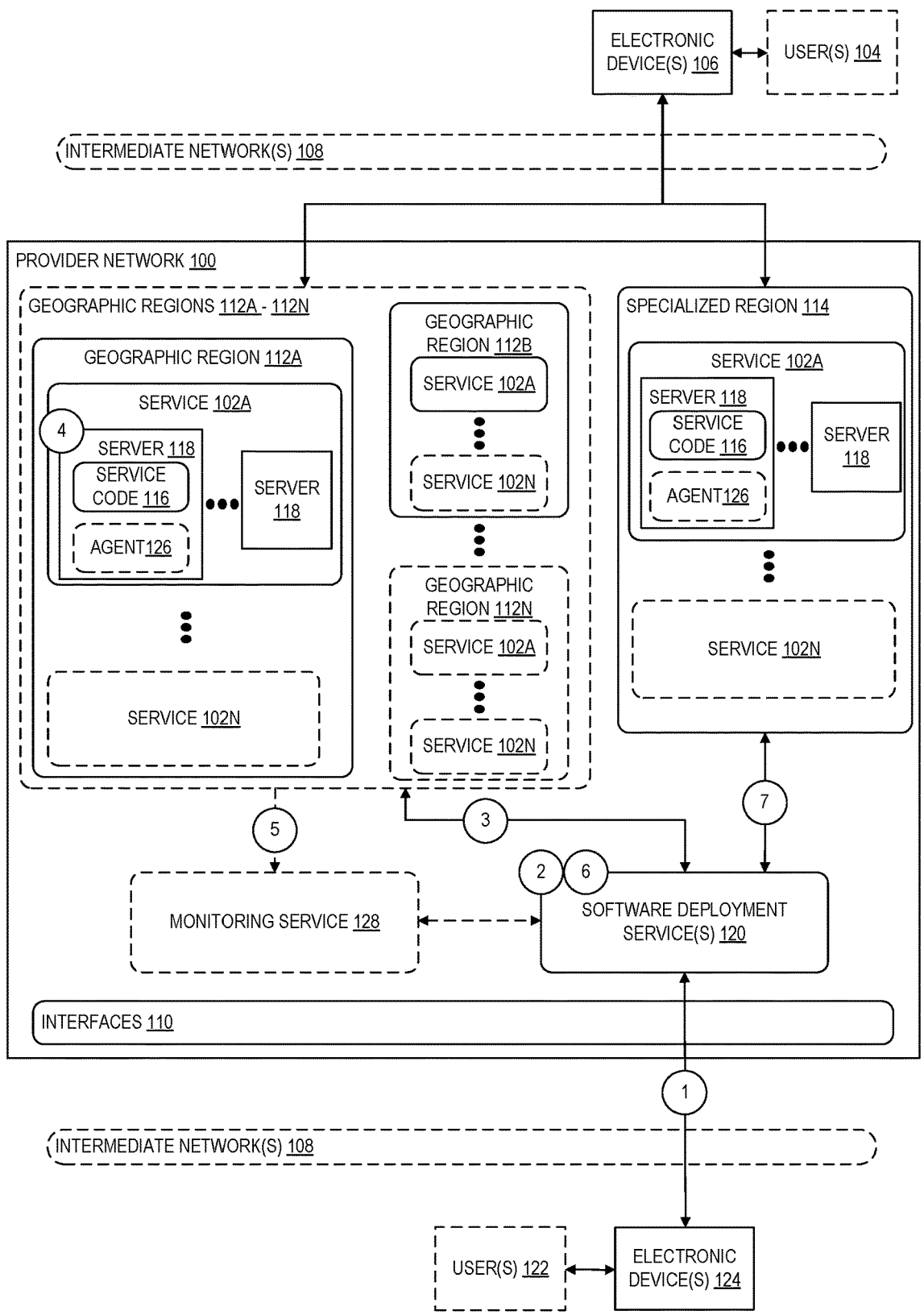
FIG. 1 is a diagram illustrating an environment including a cloud provider network comprising a set of geographic regions and one or more specialized regions that can be used to support availability-sensitive workloads according to some embodiments.

The present disclosure relates to methods, apparatus, systems, and non-transitory computer-readable storage media that enable a cloud provider network to provide specialized regions that users of the cloud provider network can use to achieve greater availability assurance for workloads highly sensitive to downtime or outages. The sensitivity of such workloads to downtime may be due to financial, regulatory, safety, or other reasons (e.g., where such workloads may require approximately 99.995% or greater availability on a yearly basis). As an example, an emergency response organization may use cloud-based resources to support call centers that persons can contact to request a dispatch in the event of an emergency, with the software that allows operation of such call centers being an example of an availability-sensitive workload. As another example, certain software run in the cloud may enable large groups of persons to engage in financial transactions, such that interruption in its availability would have a noticeable economic impact. Such availability-sensitive applications are often configured to run in multiple regions of a cloud provider network to increase their availability, compared to running in a single region. Although the existing infrastructure of a cloud provider can be designed for high resilience by having geographic compartmentalization and redundant systems in place, in certain edge cases it may be possible to have correlated failures between regions (or between the same service, like a storage service or a compute virtualization service, operating in two different regions), for example due to software updates. For availability-sensitive workloads, it can be desirable to further mitigate the likelihood of a temporary interruption in availability of a service upon which the workload is dependent.

The aforementioned challenges, among others, are addressed in some embodiments by the disclosed technology for introducing specialized regions into a cloud provider network for usage by availability-sensitive workloads, where such specialized regions are designed to avoid potential correlated failures between other regions. According to some embodiments, users of a cloud provider network may use specialized regions to complement the use of cloud provider network services in other standard geography-based regions defined by the cloud provider network, either to host redundant computing resources or for failover purposes, where the operation of a specialized region is designed to provide additional resiliency against various types of correlated failures among existing geographic regions. To achieve this additional resiliency, in some embodiments, a cloud provider network stages deployments of software updates to the web services provided by the cloud provider network in a manner that ensures that specialized regions receive such updates last and over a relatively long period of time, thereby helping to ensure that any software defects are detected in an earlier deployment of the update. As another example, in some embodiments, a cloud provider network halts the deployment of updates to specialized regions if an outage or impairment of another region is detected, or if a customer indicates that they are failing over their own workloads to resources running in a specialized region, to help provide stability in the specialized region until the impairment in the other regions is resolved.

Other aspects of specialized regions used to provide additional availability assurance are described in more detail herein.

Cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Regions are connected to a global network which includes private networking infrastructure (e.g., fiber connections controlled by the cloud provider) connecting each region to at least one other region. This infrastructure design enables users of a cloud provider network to design their applications to run in multiple regions or zones to achieve greater fault-tolerance and availability. For example, because the various regions and availability zones of a cloud provider network are connected to each other with fast, low-latency networking, users can architect applications that automatically failover between regions and availability zones with minimal or no interruption to users of the applications should an outage or impairment occur in any particular region.

Users of a cloud provider network typically assume that the infrastructure available in the regions and availability zones defined by the cloud provider network are independent of one another for availability purposes largely due to their physical separation and other isolating factors. However, while such geographic isolation and other factors reduce the likelihood of correlated inter-region failures due to geographically constrained sources of impairment (e.g., power outages, natural disasters, etc.), because each region generally receives the same software and software updates used to implement the provided cloud-based services, other types of correlated inter-region failures are possible. For example, if a same software-based defect in the software implementing a web service running in some or all geographic regions manifests itself at the same time in two or more regions, a correlated impairment of the workload can occur despite the other isolating factors.

According to embodiments described herein, a cloud provider network enables customers to use a specialized region, sometimes also referred to as a "dark" region, designed to minimize the likelihood of software-based and other correlated failure modes that may not be geographically constrained. As indicated above, in some embodiments, a specialized region is, out of all of the possible regions, the last region (or grouped together with a list of other such specialized regions as the last regions) to which a cloud provider network deploys updates to service software (e.g., updates to compute, storage, database, analytics, networking, machine learning and AI, and other services provided by a cloud provider network and upon which user applications may depend). Other aspects of a specialized region are designed to provide greater availability assurance to users of a cloud provider network. For example, in some embodiments, users can use a provided API to obtain information indicating when updates are to be deployed to a specialized region and to plan their own software deployments accordingly. As another example, because a specialized region might need to be the last region standing for some users in scenarios of improbable emergencies, a cloud provider network may temporarily halt software deployments to a specialized region if an impairment or outage is detected in any other region, or if a customer has indicated that the customer is failing over to the specialized region as a last resort.

FIG. 1 is a diagram illustrating an environment including a cloud provider network comprising a set of geography-based regions and one or more specialized regions for availability-sensitive workloads according to some embodiments. A provider network 100 (or "cloud" provider network) provides users with the ability to utilize one or more of a variety of types of computing-related resources such as compute resources (e.g., executing virtual machine (VM) instances or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services (e.g., services 102A-102N), such as a hardware virtualization service that can execute compute instances, a storage service that can store data objects, etc. The users 104 (or "customers") of provider networks 100 may utilize one or more user accounts that are associated with a customer account, though these terms may be used somewhat interchangeably depending upon the context of use. Users may interact with a provider network 100 using electronic devices 106 and across one or more intermediate networks 108 (e.g., the internet) via one or more interface(s) 110, such as through use of API calls, via a console implemented as a website or application, etc. The interface(s) 110 may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network 100 may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an API call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

A cloud provider network can be formed as a number of regions (e.g., geographic regions 112A-112N), where a region may correspond to a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the public internet, a cellular communication network).

Figure 2:
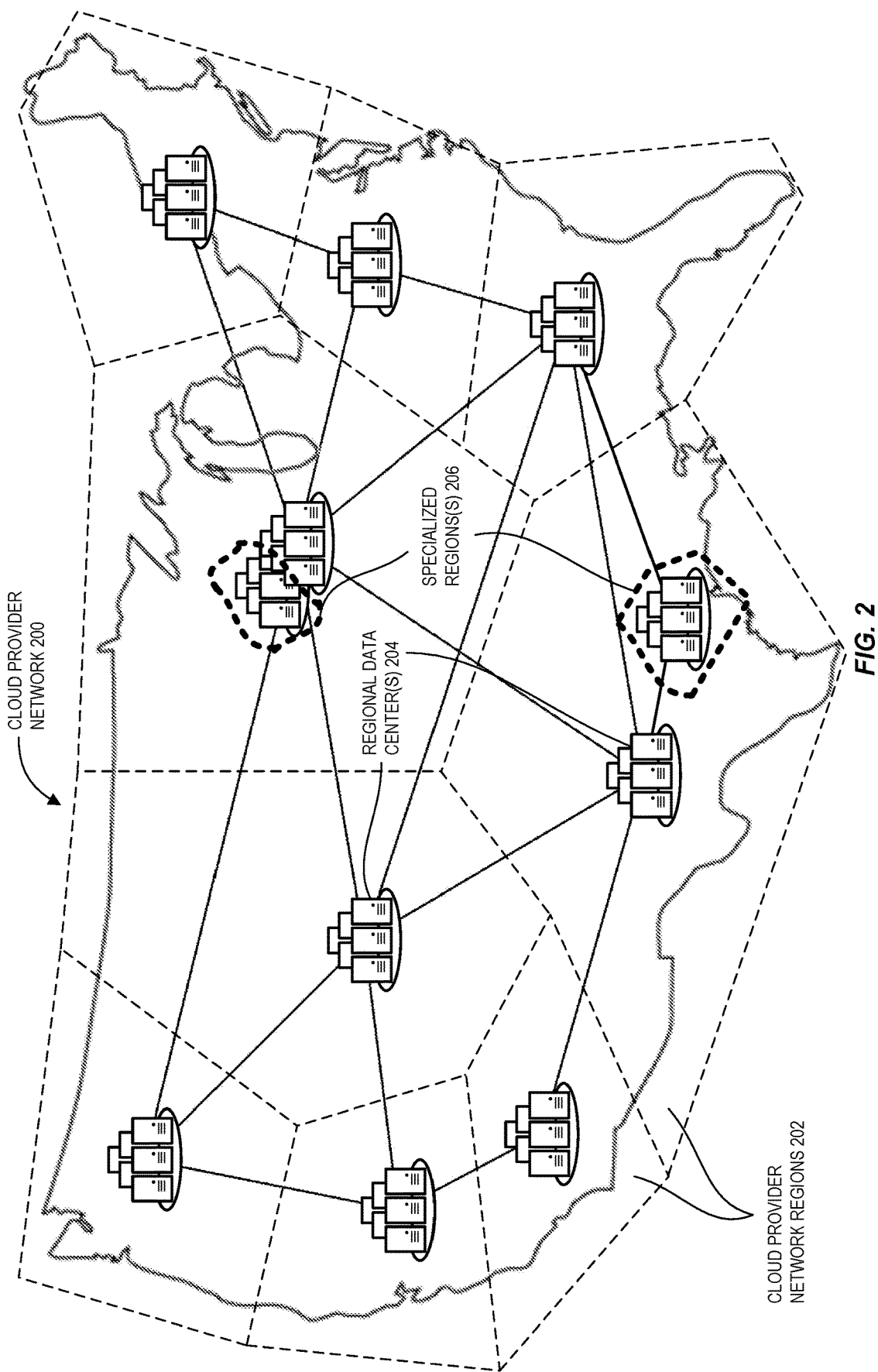
FIG. 2 illustrates an exemplary map of cloud provider network geographic regions and one or more specialized regions that can be used to support availability-sensitive workloads according to some embodiments.

FIG. 2 is a diagram illustrating an exemplary cloud provider network including a plurality of geographic regions and one or more specialized regions that can be used to support availability-sensitive workloads according to some embodiments. As indicated above and as illustrated, a cloud provider network 200 can be formed as a number of geographic regions 202, where a region is a separate geographical area in which the cloud provider has one or more data centers 204. Each region 202 can further include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the public internet, a cellular communication network, a communications service provider network). Transit Centers (TC) are the primary backbone locations linking customers to the cloud provider network and may be co-located at other network provider facilities (e.g., Internet service providers, telecommunications providers). Each region can operate two or more TCs for redundancy.

In some embodiments, a cloud provider network 200 further includes one or more specialized regions 206 alongside the geographic regions 202. As illustrated, a specialized region 206 may include one or more data centers that are co-located with data centers of an existing region 202 or availability zone, or a specialized region can be positioned in a location that geographically separate from data centers associated with other regions and availability zones. In some embodiments, a specialized region 206 also represents an isolated failure domain including facilities with separate power, separate networking, and separate cooling relative to the other regions and availability zones. In some embodiments, the isolated failure domain of a specialized region includes control plane infrastructure that is isolated from the control plane infrastructure supporting other regions and availability zones. Furthermore, in some embodiments, a cloud provider network may provide one or more services that span some or all the geographic regions 202 (e.g., a Domain Name System (DNS) web service, an identity and access management service, and other services that share state and other across regions); however, a specialized region 206 may include a version of some or all of those services such that the services do not share state with other regions to provide further isolation.

As indicated above, if a user has developed an availability-sensitive system or workload that the user plans to deploy using resources provided a cloud provider network, the user may strive to implement the workload such that it can operate as long as one region of the cloud provider network is available. In this example, the user can deploy their workload across multiple regions (e.g., across two or more of regions 202) and further deploy the workload to, or otherwise enable the workload to failover to, at least one specialized region 206.

Referring again to FIG. 1, the numbered circles "1"-"7" illustrate a process that includes a software deployment service receiving an indication that an update is available to software implementing a computing service (e.g., service code 116) of the cloud provider network 100, deploying the update to servers running at least one geographic region of a plurality of geographic regions defined by the cloud provider network (e.g., servers 118 running in geographic regions 112A-112N), determining that the computing service is fully operational in the at least one geographic region, and deploying the update to a specialized region 114. In some embodiments, the software deployment service(s) execute using computing resources that are globally-accessible to resources running in geographic regions 112A-112, or the service(s) execute using computing resources located in one or more geographic regions 112A-112N, or any combination thereof. For example, in some embodiments, each of geographic regions 112A-112N includes software deployment service components that operate in a federated fashion to manage the deployment of software updates, possibly under the coordination of one or more centralized, global software deployment service components 120.

In some embodiments, at circle "1," a software deployment service 120 receives an indication that an update is available to software implementing a computing service of a cloud provider network. For example, a software deployment service 120 may receive the indication based on a user 122 (e.g., a software developer working on the software implementing the computing service) using an electronic device 124 to access an interface provided by the software deployment service 120 to request deployment of an update to a service running in some number of regions.

In some embodiments, the computing service to which the update relates can include any computing service provided to users of the provider network 100 (e.g., any of services 102A-102N shown as part of geographic regions 112A-112N and a specialized region 114). As indicated above, examples of a computing service include, but are not limited to, compute, storage, database, analytics, networking, machine learning and AI, and other services provided by a cloud provider network. In some embodiments, the software update can include any changes to the software or other components that support operation of the service within one or more geographic regions of the cloud provider network 100. For example, the software update can include changes to the code implementing the service, changes to networking configurations or security configurations, or any other changes to the operation of the service.

As indicated above, in some embodiments, the software deployment service 120 controls when a software update is deployed to geographic regions 112A-112N and to a specialized region 114. For example, the software deployment service 120 may stage the deployment such that any updates to a web service are deployed to the specialized region last (that is, after the update has been deployed to all other regions in which the service operates). In this manner, if there is a software defect in the update that does not manifest itself for a period of time, or if some other aspect of the systems hosting the service cause an impairment, deploying the update to the specialized region last provides a best chance that the software defect or impairment can be detected and resolved prior to its introduction in the specialized region 114.

In some embodiments, at circle "2," the software deployment service 120 processes the deployment request and generates a deployment plan, where the deployment plan involves staging deployment of the software update across the geographic regions 112A-112N and finally to the specialized region 114. The generation of the deployment plan can include, for example, determining which geographic regions 112A-112N support the service to be updated, determining which regions have already received the update, if any, and so forth. In general, updates to a service may be tested in multiple test "stages" (e.g., pre-production and limited-production environments) to ensure the update has been tested in a variety of environments before it could affect external users of the service. In some embodiments, update deployments can further involve "canary" tests that execute real customer actions repeatedly in order to prove end-to-end functionality is working in production.

In some embodiments, at circle "3," the software deployment service 120 deploys the update to servers operating in one or more of the geographic regions 112A-112N according to the deployment plan (e.g., including the servers 118 in geographic region 112A, which may include physical servers, VMs, containers, or any combination thereof). In some embodiments, the servers 118 running software supporting a service include a software agent (e.g., an agent 126) running on the server that is capable of communicating with a software deployment service 120, obtaining software updates, staging the software updates locally on the server, and upgrading the software when instructed. The software deployment service 120 thus orchestrates the deployment of software updates in coordination with the agents running on the servers hosting the service software. In some embodiments, the deployment of an update includes sending update files to the agent and one or more scripts to run on each instance during the deployment. In some embodiments, the software deployment service 120 informs the servers that an update is available and instructs the servers when to install the update; in other embodiments, the servers in the regions periodically query the software deployment service 120 for updates and install the updates when available.

In some embodiments, the process of carrying out the deployment plan is enforced programmatically by the software deployment service 120 and associated systems. For example, the software deployment service 120 may check with a calendar-based system or other mechanism that determines when the update can be deployed to each region. As indicated, in some embodiments, the software deployment service 120 is blocked from deploying the software update to the specialized region 114 until one or more conditions are satisfied indicating that the service is fully operational in other regions with the update installed. For example, the software deployment service 120 may include logic that prevents the service from deploying the update until the one or more conditions are met. In some embodiments, the software deployment service 120 not be able to access servers in a specialized region 114 until the conditions are met; for example, the network ports used to deploy updates to servers in the specialized region 114 may be blocked until the one or more conditions are met. In other embodiments, other mechanisms may be used to ensure that the software deployment service 120 deploys updates to the specialized region 114 only after the update has been deployed to other geographic regions.

In some embodiments, at circle "4," the servers in the geographic regions install the update as instructed by the software deployment service 120. As indicated above, in some embodiments, the installation of the update can be managed by an agent running on the server that coordinates the installation with the software deployment service 120.

In some embodiments, at circle "5," the servers in the regions to which the update has been deployed generate metrics and send the metrics to a monitoring service 128 or other location accessible to the software deployment service 120. For example, the metrics may include metrics related to operation of the service including request processing throughput, error rates, or any other metrics relevant to particular services. In some embodiments, the metrics relate at least in part to the behavior of users of the services being updated such as, for example, a number of incoming user requests, a number of processed user requests, a number of user reported errors, and the like. In some embodiments, the metrics are sent directly to the software deployment service 120, or otherwise obtained by the software deployment service 120.

In some embodiments, at circle "6," the software deployment service 120 determines, based on the metrics generated by the servers in the geographic regions to which the update is deployed, whether the service is fully operational in the regions to which the update has been deployed. In some embodiments, the analysis of the metrics may include multiple analyses as part of a staged deployment of the update across multiple of the geographic regions 112A-112N. In some embodiments, the determination of whether the service is fully operational in any particular region includes determining whether the service is exhibiting performance characteristics that satisfy one or more conditions. For example, the software deployment service 120 can analyze the metrics to determine whether the service's request processing throughput exceeds a threshold based on the service's measured throughput before the update, to determine whether the service is experiencing any other anomalous performance characteristics, and the like. In some embodiments, the determination of whether the service is fully operational can further include determining whether one or more automated tests of the service are successfully passed. In some embodiments, at least one of the automated tests analyzes a metric related to behavior of users of the service.

In some embodiments, at circle "7," the software deployment service 120 deploys the software to the specialized region 114 once the service determines that the update is not causing any apparent outages or impairments in the other geographic regions 112A-112N. In this manner, the update is deployed to the specialized region 114 last relative to the deployment to the geographic regions 112A-112N, and after the software deployment service 120 obtains one or more indications that the relevant service(s) are fully operational. In some embodiments, the software update may not be deployed to the specialized region 114 until a defined duration of time has passed.

Figure 3:
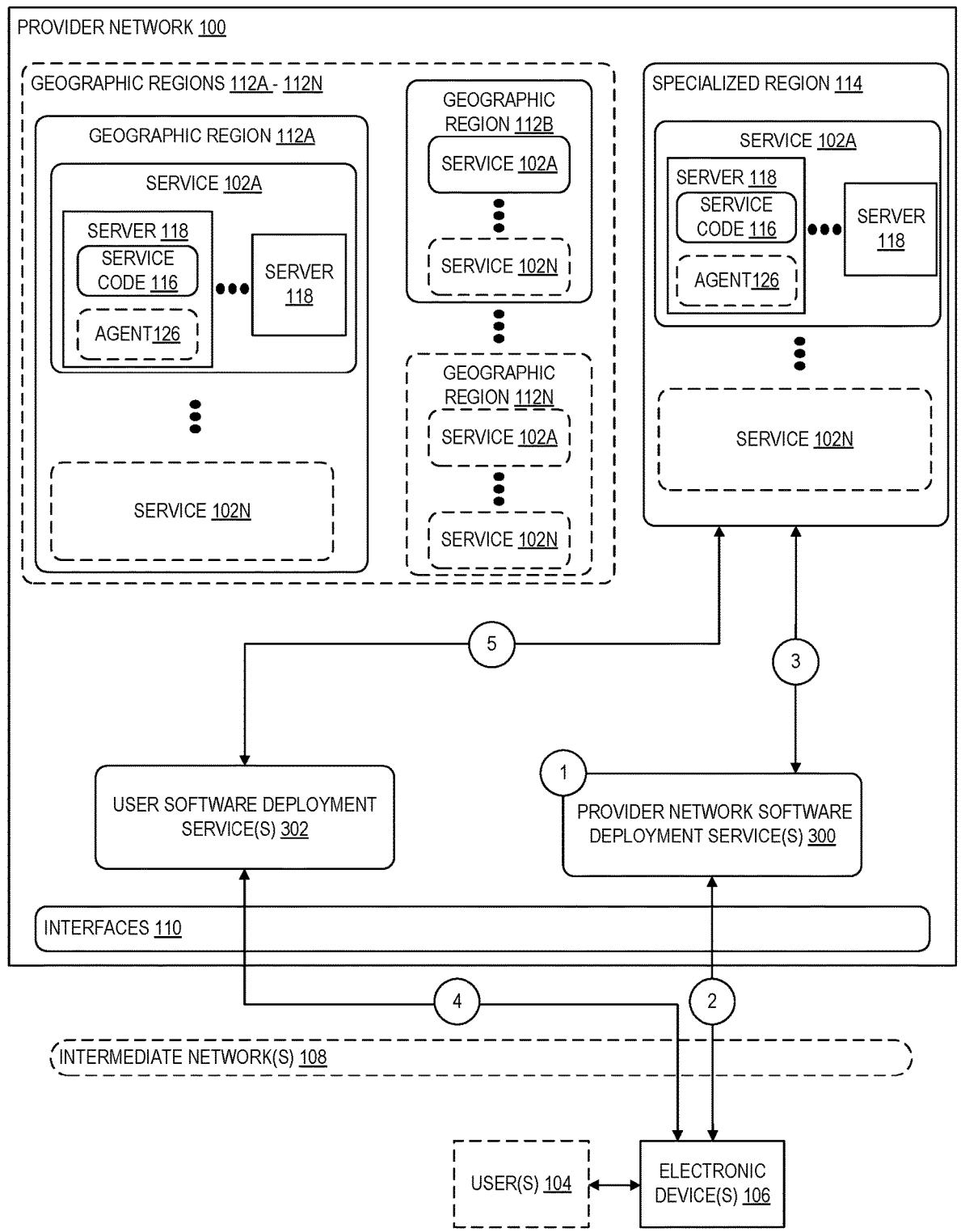
FIG. 3 is a diagram illustrating an environment in which a software deployment service provides an application programming interface (API) that can be used to obtain information related to software update deployment schedules affecting a specialized region of a cloud provider network according to some embodiments.

FIG. 3 is a diagram illustrating an environment in which a provider software deployment service provides an API that can be used by users of the provider network 100 to obtain information related to software update deployment schedules affecting a specialized region of a cloud provider network according to some embodiments. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

As indicated, a user may use such information to determine a time at which to deploy updates to user-managed workloads running on computing resources in the specialized region, among other purposes. For example, a user may desire to deploy their own software updates using a user software deployment service 302 near in time to deployments of provider network software updates to a specialized region, or to stagger deployments of user application updates relative to updates deployed to a specialized region 114.

In some embodiments, at circle "1," the provider network software deployment service(s) 300 receive an indication that a software update to a service is to be deployed and generates a deployment plan, including an estimated time at which the software update is to be deployed to a specialized region 114.

In some embodiments, at circle "2," a user of the cloud provider network 100 sends a request to the provider network software deployment service 300, or to another service that interfaces with the provider network software deployment service 300, requesting information about upcoming software deployments to the specialized region 114. In some embodiments, the user generates the request using a web-based console provided by the provider network 100 or using another interface such as a command line console. In some embodiments, at circle "3," the provider network software deployment service(s) 300 deploys the software update to the specialized region 114 according to the deployment plan for the update (e.g., after the update has been deployed to other geographic regions 112A-112N as described in reference to FIG. 1).

In some embodiments, at circle "4," the user of the cloud provider network 100 uses a user software deployment service 302 to request deployment of an update to the user's software based on the obtained specialized region update deployment information, as desired. As indicated above, a user may choose to deploy their own software in coordination with the deployment of an update to the service software, or a user may choose to deploy their own software at a time that does not coincide with an update to service software. Although FIG. 3 illustrates an example of a user sending a request for information about service software deployment plans, in other embodiments, the provider network software deployment service 300 additionally or alternatively automatically generates notifications to users indicating service software deployment schedules (e.g., as a notification displayed in a web-based console, as a notification message, etc.).

Figure 4:
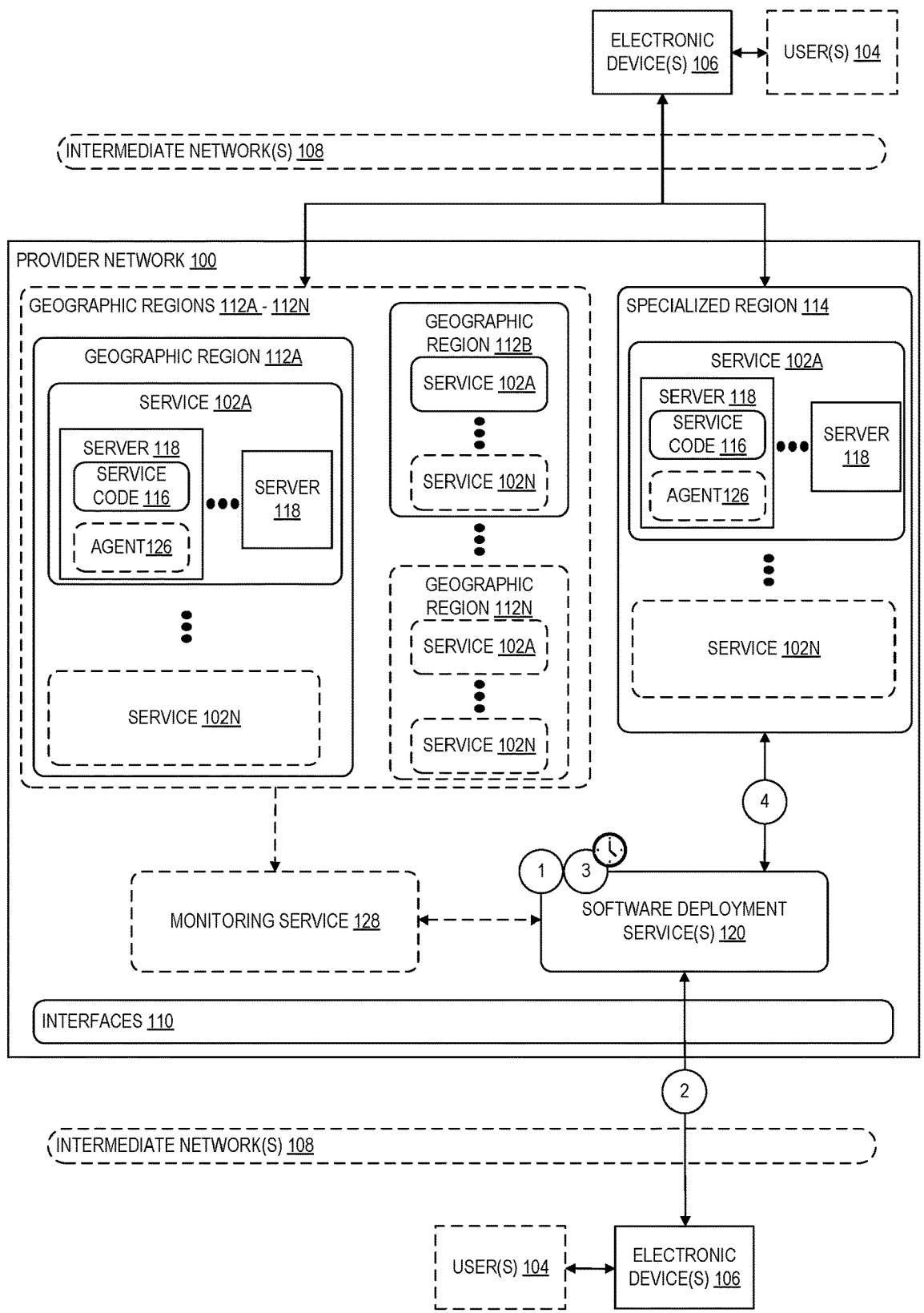
FIG. 4 is a diagram illustrating an environment in which a software deployment service temporarily halts the deployment of software updates to a specialized region responsive to a detected outage or impairment affecting one or more geographic regions of a cloud provider network according to some embodiments.

In some embodiments, a software deployment service 120 monitors the health of services in various geographic regions and halts deployments of software updates to specialized regions if any service outages or impairments are detected in a geographic region. FIG. 4 is a diagram illustrating an environment in which a software deployment service halts the deployment of software updates to a specialized region responsive to detecting impairment of a service in one or more geographic regions of a cloud provider network according to some embodiments.

In some embodiments, at circle "1," the software deployment service 120 obtains an indication that an outage or impairment affecting one or more services is occurring in a geographic region. The indication of the outage or impairment may originate from a geographic region, from a monitoring service 128, from a user, or from any other source.

In some embodiments, at circle "2," the software deployment service 120 receives an indication that an update to a service is ready for deployment. In some embodiments, at circle "3," the software deployment service 120 temporarily halts the deployment of the software update to one or more specialized regions of the cloud provider network 100. As indicated above, the software deployment service 120 temporarily halts the deployment responsive to the indication of the outage or impairment affecting a service in a geographic region. The service that is affected by the outage or impairment may be same service to which the update relates, or may be service that is not directly related to the update.

In some embodiments, at circle "4," once the software deployment service 120 obtains an indication that the affected services are again fully operational in the other geographic regions, the software deployment service 120 deploys the software update to the specialized regions. In some cases, it may be determined that the software update to be deployed was the cause the outage or impairment of the service in the other regions, in which case the deployment of software update may be terminated and replaced with a software update that does not include the same defects.

Figure 5:
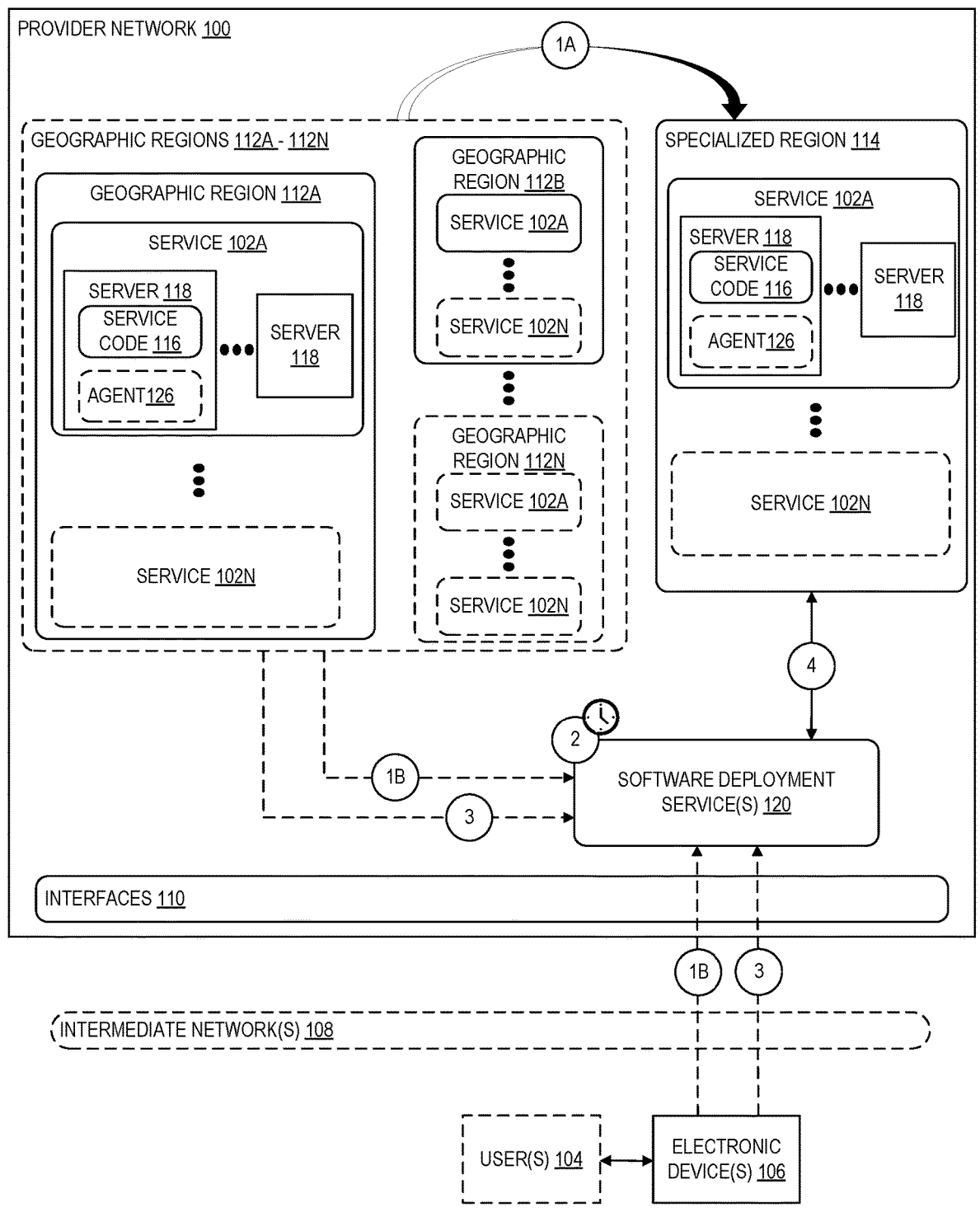
FIG. 5 is a diagram illustrating an environment in which a software deployment service temporarily halts the deployment of software updates to a specialized region responsive to an indication that a user is failing over a user-managed application to the specialized region according to some embodiments.

In some embodiments, the software deployment service 120 enables a user of the cloud provider network 100 to provide indications that the user's application or system is experiencing an outage or impairment in another geographic region, or that the user is otherwise failing over their own software systems to a specialized region, and thus the user desires for software updates to services in the specialized region to be temporarily halted. FIG. 5 is a diagram illustrating an environment in which a software deployment service temporarily halts the deployment of software updates to a specialized region responsive to an indication that a user is failing over user-managed computing resources to the specialized region according to some embodiments.

In some embodiments, at circle "1A," a user managed workload performs a failover from one or more of geographic regions 112A-112N to a specialized region 114. The failover may occur automatically in response to detecting an outage or impairment of the workload in the geographic regions, or may be performed manually based on a user noticing that the workload is impaired.

In some embodiments, at circles "1B," the software deployment service 120 receives an indication, either from servers running in one or more of geographic regions 112A-112N or from a user associated with an application running in the one or more regions, that the user's workload is failing over to the specialized region 114. The indication may be received prior to, concurrently with, or after the failover occurs in circle "1A." The indication may be sent, for example, automatically be one or more servers running in the geographic regions 112A-112N via an API request, or by a user using a web-based console or other interface.

In some embodiments, at circle "2," the software deployment service 120 temporarily halts deployments of software updates to the specialized region. In some embodiments, at circle "3," the software deployment service 120 receives an indication that the outage or impairment of the user's workload in the geographic regions 112A-112N has been resolved and that the user is no longer depending on the operation of the specialized region 114. In some embodiments, the software deployment service 120 may set a maximum amount of time that a user can halt deployments to the specialized region 114. In some embodiments, once the software deployment service 120 receives the indication that the outage or impairment of the user's workload has been resolved, at circle "4," the software deployment service 120 continues to deploy software updates to services running in the specialized region as described above in reference to FIG. 1, for example.

In some embodiments, a specialized region 114 can be used as part of "game day" testing in which a failure or event is simulated in one or more of geographic regions 112A-112N and users can ensure that efficient failover mechanisms to a specialized region 114 are in place. For example, to help users prove the specialized region 114 works as intended, the cloud provider network 100 may have periodic "game days" during which user access to one or more geographic regions 112A-112N is blocked, enabling users to test whether their systems still operate relying solely on the specialized region 114 as a last resort.

Figure 6:
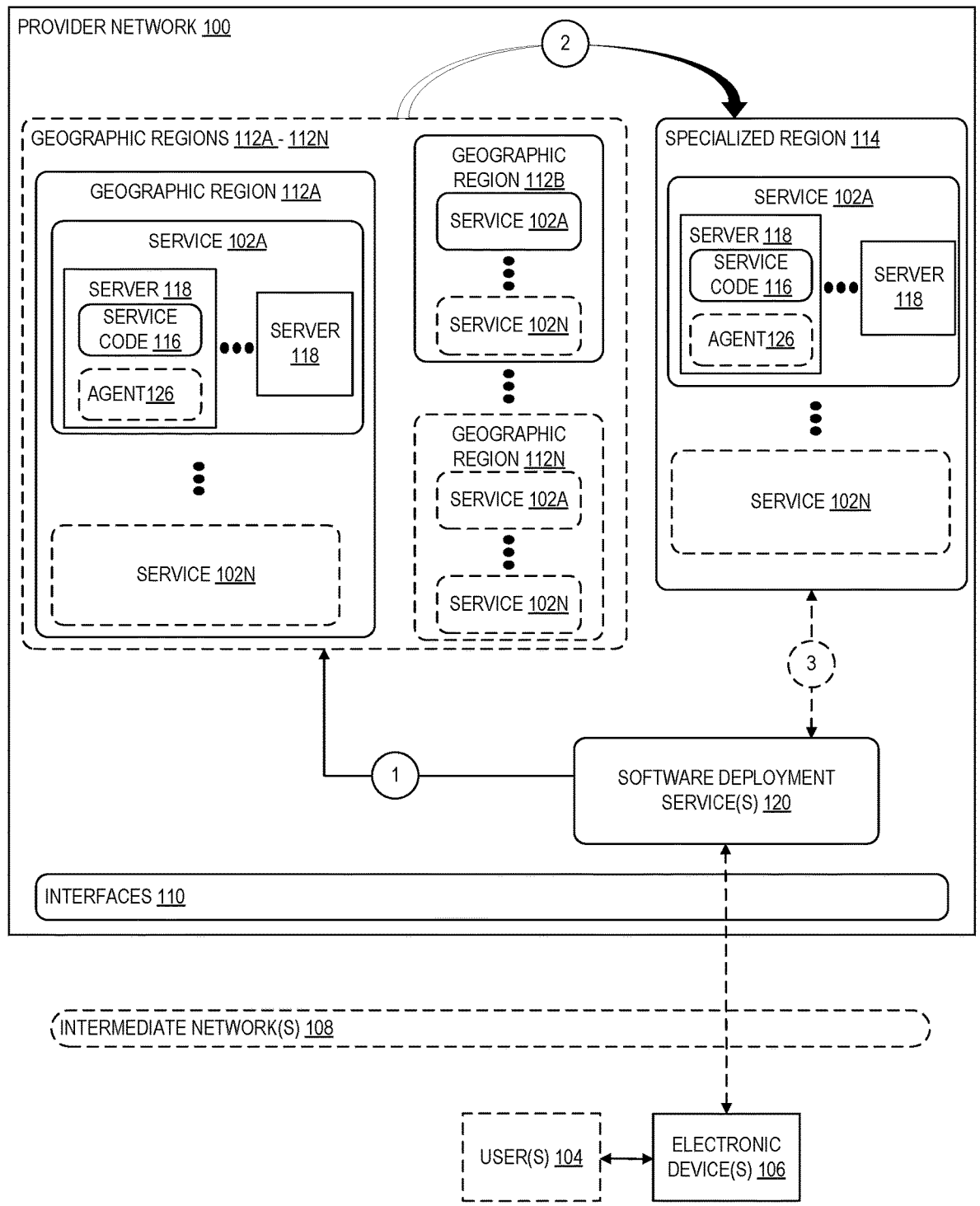
FIG. 6 is a diagram illustrating an environment in which a software deployment service performs a "game day" test simulating an outage or impairment of one or more geographic regions to test users' ability to failover to a specialized region according to some embodiments.

FIG. 6 is a diagram illustrating an environment in which a software deployment service performs a "game day" test simulating an outage or impairment of one or more geographic regions to test users' ability to failover to a specialized region according to some embodiments. In some embodiments, at circle "1" in FIG. 6, a software deployment service 120 sends a command to one or more geographic regions 112A-112N instructing the regions to perform a "game day" test of the region wherein the region simulates an outage or impairment of one or more services running in the region. Users hosting resources within the one or more regions may be informed of a schedule for performing the "game day" test in advance. In some embodiments, the simulated outage or impairment of the one or more services causes, at circle "2," user workloads to failover to resources running in a specialized region 114. In some embodiments, at circle "3," the software deployment service 120 monitors the failover the resources and the specialized region 114 generally to ensure that the failover processes operated as expected.

Figure 7:
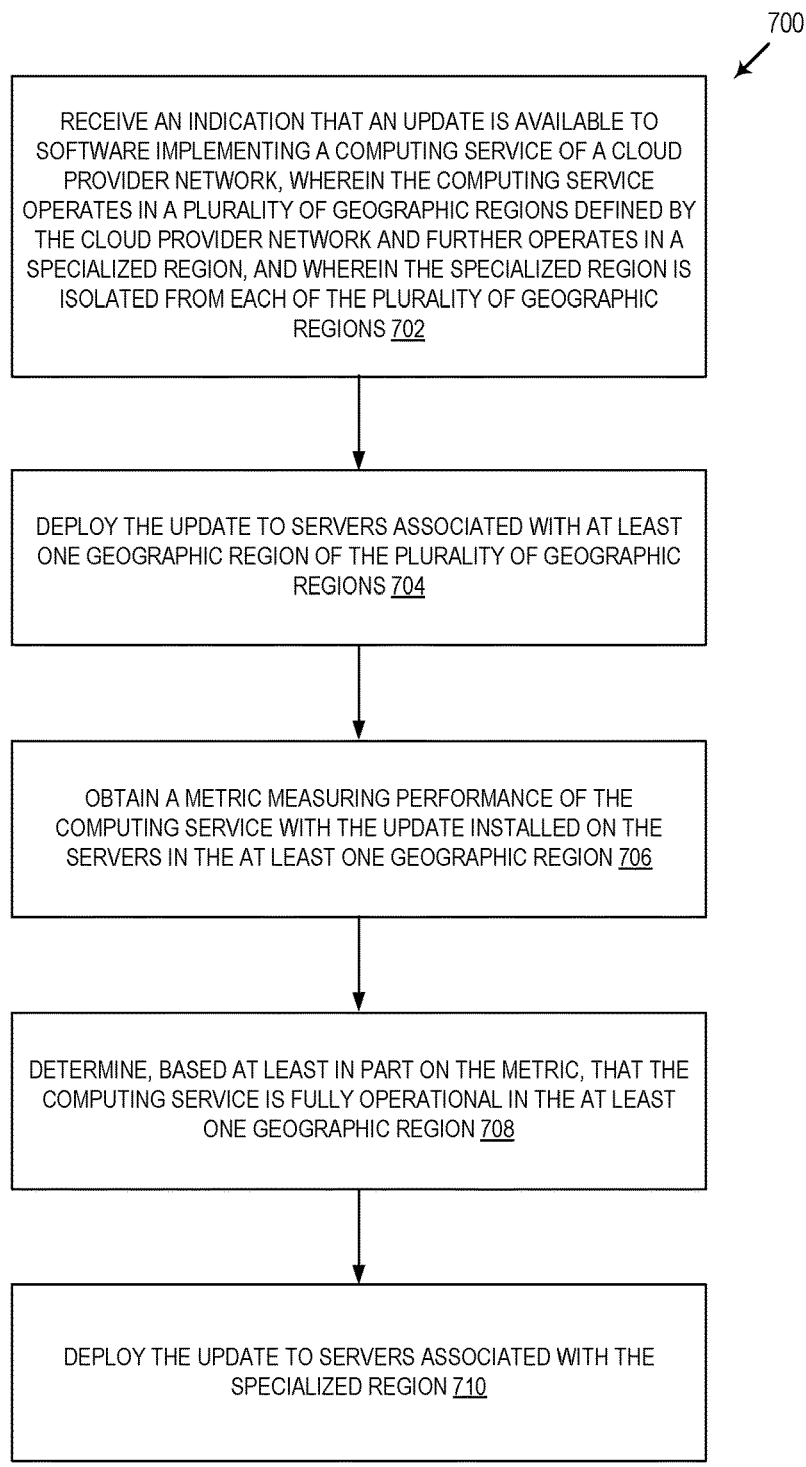
FIG. 7 is a flow diagram illustrating operations of a method for deploying software updates to a plurality of regions including one or more specialized regions according to some embodiments.

FIG. 7 is a flow diagram illustrating operations 700 of a method for enabling a cloud provider network to provide specialized regions that customers can use to achieve greater availability assurance for workloads highly sensitive to downtime or outages according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by a software deployment service 120 of the other figures.

The operations 700 include, at block 702, receiving an indication that an update is available to software implementing a computing service of a cloud provider network, wherein the computing service operates in a plurality of geographic regions defined by the cloud provider network and further operates in a specialized region, and wherein the specialized region is isolated from each of the plurality of geographic regions.

The operations 700 further include, at block 704, deploying the update to servers associated with at least one geographic region of the plurality of geographic regions.

The operations 700 further include, at block 706, obtaining a metric measuring performance of the computing service with the update installed on the servers in the at least one geographic region.

The operations 700 further include, at block 708, determining, based at least in part on the metric, that the computing service is fully operational in the at least one geographic region.

The operations 700 further include, at block 710, deploying the update to servers associated with the specialized region.

In some embodiments, the operations further include receiving an API request for information about a schedule for deploying the update to the specialized region; and sending a responding indicating a time at which the update is to be deployed to the specialized region.

In some embodiments, the operations further include receiving an API request indicating that a customer is failing over to resources hosted in the specialized region; and delaying deployment of the update to the specialized region.

In some embodiments, the operations further include receiving an indication that a second update is available to software implementing the computing service; receiving an indication that the service is not fully operational in a geographic region of the cloud provider network; and delaying deployment of the second update to the specialized region.

In some embodiments, the specialized region is isolated from each of the plurality of geographic regions based on one or more of: separate hardware resources, separate control plane resources, separate power infrastructure, separate geographic areas, or separate networking infrastructure.

In some embodiments, the update is deployed by a software deployment service of the cloud provider network in coordination with software agents running on the servers in the specialized.

In some embodiments, the operations further include determining that the computing service is fully operational in the at least one geographic region further includes determining that one or more automated tests of the service are successfully passed.

In some embodiments, the update is a first update and the computing service is a first computing service, and the operations further include: receiving an indication that a second update is available to software implementing the first computing service; receiving an indication that a second computing service is not fully operational in a geographic region of the cloud provider network; and delaying deployment of the second update to the specialized region.

In some embodiments, the computing service includes at least one of: a hardware virtualization service, a block storage service, a database service, an on-demand code execution service, or a networking service.

Figure 8:
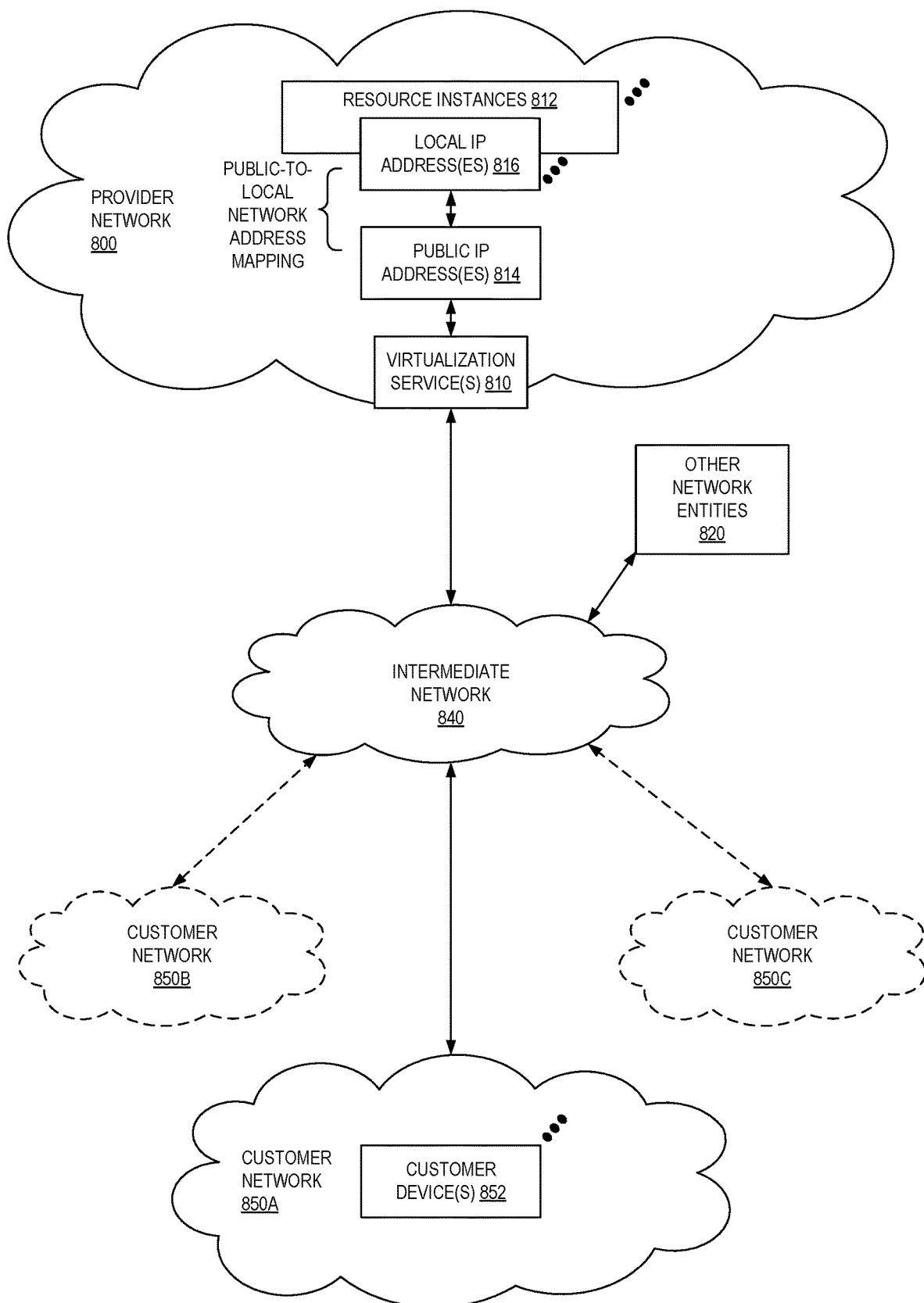
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
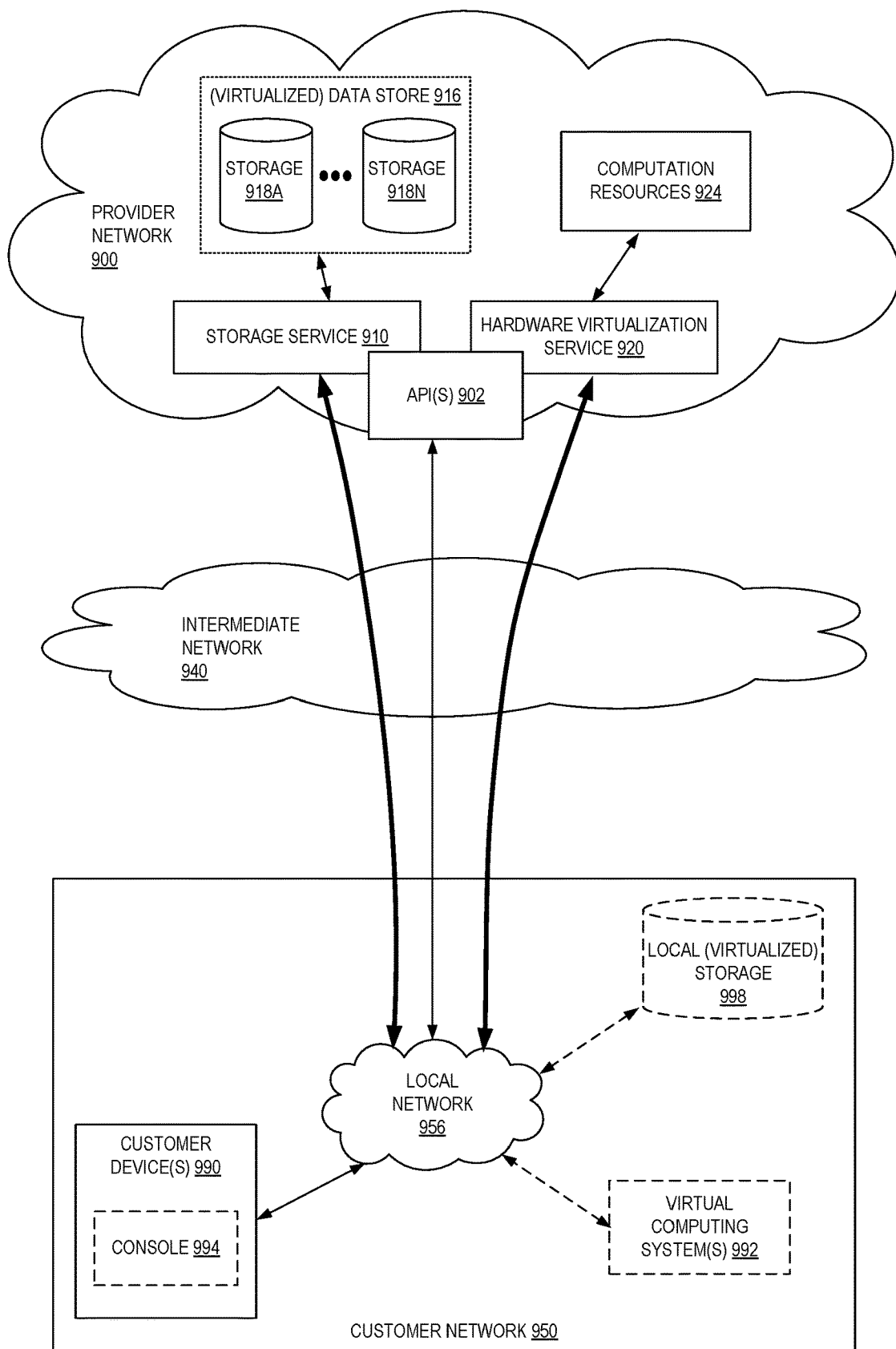
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtual data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
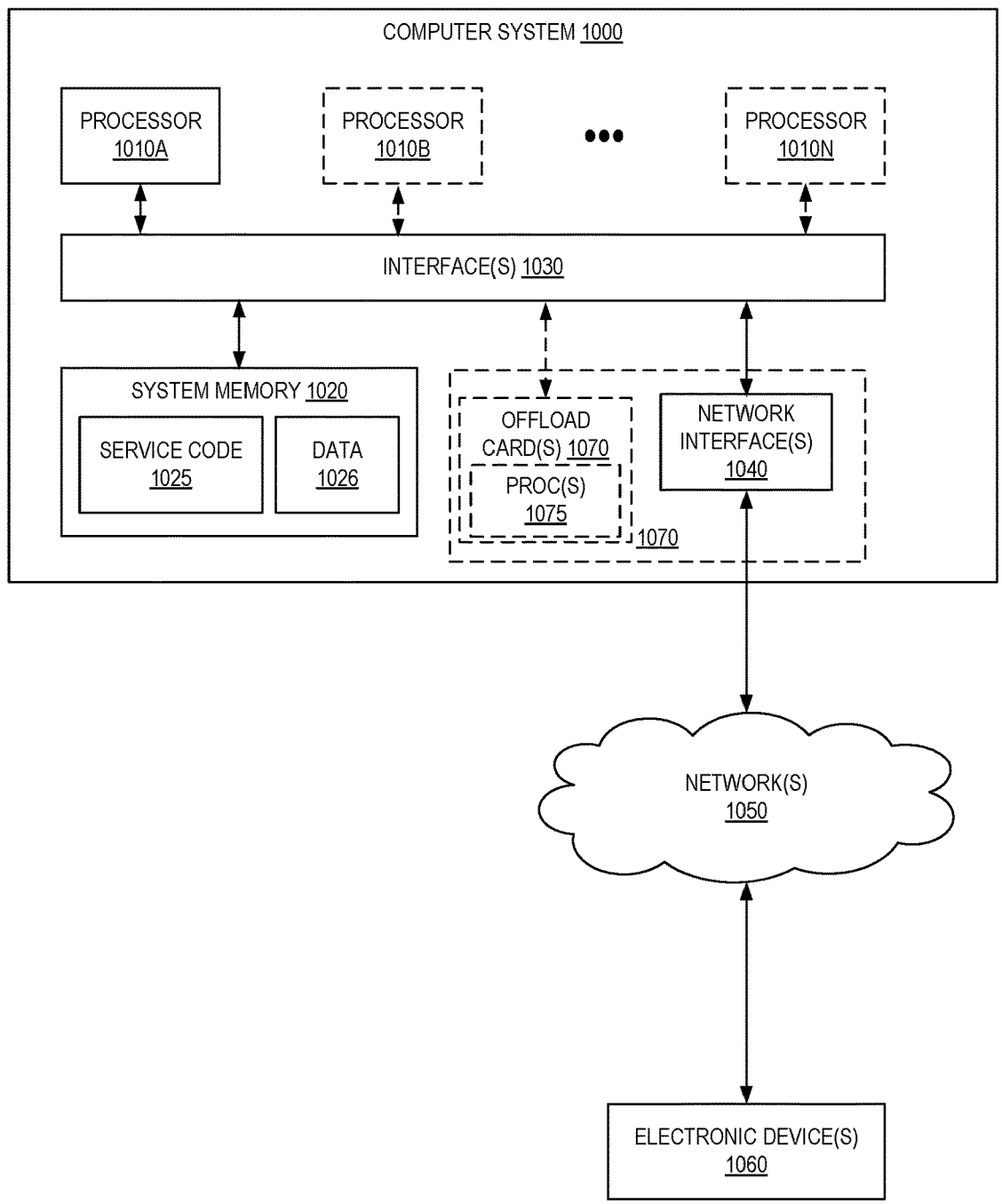
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as service code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®. Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-'P18N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving an indication that an update is available to software implementing a computing service of a cloud provider network, wherein the computing service operates in a plurality of geographic regions defined by the cloud provider network and further operates in a specialized region defined by the cloud provider network, wherein the cloud provider network defines the specialized region as a type of region that is distinct from the plurality of geographic regions, wherein the specialized region is isolated from each of the plurality of geographic regions, and wherein a software deployment service deploys any updates to computing services provided by the specialized region last relative to the plurality of geographic regions;
    deploying the update to servers associated with at least one geographic region of the plurality of geographic regions;
    obtaining a metric measuring performance of the computing service with the update installed on the servers in the at least one geographic region;
    determining, based at least in part on the metric, that the computing service is fully operational in the at least one geographic region; and
    deploying, by the software deployment service, the update to servers associated with the specialized region.

2. The computer-implemented method of claim 1, further comprising:
    receiving an application programming interface (API) request for information about a schedule for deploying the update to the specialized region; and
    sending a response indicating a time at which the update is to be deployed to the specialized region.

3. The computer-implemented method of claim 1, further comprising:
   receiving an application programming interface (API) request indicating that a customer is failing over to resources hosted in the specialized region; and
   delaying deployment of the update to the specialized region.

4. A computer-implemented method comprising:
   deploying, by a software deployment service and to servers associated with at least one geographic region of a plurality of geographic regions defined by a cloud provider network, an update to software implementing a computing service provided by the cloud provider network, wherein the cloud provider network further defines a specialized region including implementations of a plurality of computing services including the computing service, wherein the cloud provider network defines the specialized region as a type of region that is distinct from the plurality of geographic regions, and wherein the software deployment service deploys any updates to computing services provided by the specialized region last relative to the plurality of geographic regions;
   obtaining a metric measuring performance of the computing service with the update installed on the servers in the at least on geographic region;
   determining, based at least in part on the metric, that the computing service is fully operational in the at least one geographic region; and
   deploying, by the software deployment service, the update to servers associated with the specialized region.

5. The computer-implemented method of claim 4, further comprising:
   receiving an application programming interface (API) request for information about a schedule for deploying the update to the specialized region; and
   sending a response indicating a time at which the update is to be deployed to the specialized region.

6. The computer-implemented method of claim 4, further comprising:
   receiving an application programming interface (API) request indicating that a customer is failing over to resources hosted in the specialized region; and
   delaying deployment of the update to the specialized region.

7. The computer-implemented method of claim 4, wherein the update is a first update, and wherein the method further comprises:
   receiving an indication that a second update is available to software implementing the computing service;
   receiving an indication that the computing service is not fully operational in a geographic region of the cloud provider network; and
   delaying deployment of the second update to the specialized region.

8. The computer-implemented method of claim 4, wherein the specialized region is isolated from each of the plurality of geographic regions based on one or more of: separate hardware resources, separate control plane resources, separate power infrastructure, separate geographic areas, or separate networking infrastructure.

9. The computer-implemented method of claim 4, wherein the update is deployed by a software deployment service of the cloud provider network in coordination with software agents running on the servers in the specialized region.

10. The computer-implemented method of claim 4, wherein determining that the computing service is fully operational in the at least one geographic region further includes determining that operation of the computing service passes an automated test that analyzes a metric related to behavior of users of the computing service.

11. The computer-implemented method of claim 4, wherein the update is a first update and the computing service is a first computing service, and wherein the method further comprises:
    receiving an indication that a second update is available to software implementing the first computing service;
    receiving an indication that a second computing service is not fully operational in a geographic region of the cloud provider network; and
    delaying deployment of the second update to the specialized region.

12. The computer-implemented method of claim 4, wherein the computing service includes at least one of: a hardware virtualization service, a block storage service, a database service, an on-demand code execution service, or a networking service.

13. The computer-implemented method of claim 4, wherein the update to the software implementing the computing service includes at least one of: a change to code implementing the computing service, a change to a networking configuration associated with the computing service, a change to a security configuration associated with the computing service.

14. The computer-implemented method of claim 4, wherein the update to the software implementing the computing service is deployed by a software deployment service of the cloud provider network, and wherein the software deployment service is blocked from accessing servers in the specialized region until it is determined that the computing service is fully operational in the at least one geographic region.

15. The computer-implemented method of claim 4, further comprising sending, by a software deployment service, instructions to the at least one geographic region to simulate an outage of the computing service, the outage causing at least one user workload to fail over to the specialized region.

16. A system comprising:
    a software deployment service of a cloud provider network implemented by a first one or more electronic devices, the software deployment service including instructions that upon execution cause the software deployment service to:
      deploy, to servers associated with at least one geographic region of a plurality of geographic regions defined by a cloud provider network, an update to software implementing a computing service provided by the cloud provider network, wherein the cloud provider network further defines a specialized region including implementations of a plurality of computing services including the computing service, wherein the cloud provider network defines the specialized region as a type of region that is distinct from the plurality of geographic regions, and wherein the software deployment service deploys any updates to computing services provided by the specialized region last relative to the plurality of geographic regions;
      obtain a metric measuring performance of the computing service with the update installed on the servers in the at least on geographic region;

determine, based at least in part on the metric, that the computing service is fully operational in the at least one geographic region; and deploy the update to servers associated with a specialized region; and a server hosted in a specialized region of the cloud provider network implemented by a second one or more electronic devices, the server including instructions that upon execution cause the server to:

obtain the update from the software deployment service, and install the update at the server hosted in the specialized region.

17. The system of claim 16, wherein the instructions further cause the software deployment service to:

receive an application programming interface (API) request for information about a schedule for deploying the update to the specialized region; and send a response indicating a time at which the update is to be deployed to the specialized region.

18. The system of claim 16, wherein the instructions further cause the software deployment service to:

receive an application programming interface (API) request indicating that a customer is failing over to resources hosted in the specialized region; and delay deployment of the update to the specialized region.

19. The system of claim 16, wherein the update is a first update, and wherein the instructions further cause the software deployment service to:

receive an indication that a second update is available to software implementing the computing service;

receive an indication that the computing service is not fully operational in a geographic region of the cloud provider network; and delay deployment of the second update to the specialized region.

20. The system of claim 16, wherein the specialized region is isolated from each of the plurality of geographic regions based on one or more of: separate hardware resources, separate control plane resources, separate power infrastructure, or separate geographic areas.

* * * * *